United States Patent
Citti et al.

(10) Patent No.: US 9,573,850 B2
(45) Date of Patent: Feb. 21, 2017

(54) DOPED SINTERED PRODUCT BASED ON ZIRCON AND ZIRCONIA

(75) Inventors: Olivier Citti, Wellesley, MA (US); Julien Fourcade, Shrewsbury, MA (US); Michel Gaubil, Les Angles (FR); Charles Nicholas McGarry, Buckhannon, WV (US); Michael J. Seaborne, Hubbardston, MA (US)

(73) Assignee: SAINT-GOBAIN CENTRE DE RECHERCHES ET D'ETUDES EUROPEEN, Courbevoie (FR)

(*) Notice: Subject to any disclaimer, the term of this patent is extended or adjusted under 35 U.S.C. 154(b) by 2166 days.

(21) Appl. No.: 12/519,630

(22) PCT Filed: Dec. 20, 2007

(86) PCT No.: PCT/FR2007/052590
§ 371 (c)(1),
(2), (4) Date: Sep. 28, 2009

(87) PCT Pub. No.: WO2008/084175
PCT Pub. Date: Jul. 17, 2008

(65) Prior Publication Data
US 2010/0012484 A1 Jan. 21, 2010

(30) Foreign Application Priority Data
Dec. 21, 2006 (FR) .................................. 06 55804

(51) Int. Cl.
C04B 41/52 (2006.01)
C03B 5/43 (2006.01)
C04B 35/482 (2006.01)

(52) U.S. Cl.
CPC ............... *C04B 35/482* (2013.01); *C03B 5/43* (2013.01); *C04B 2235/3205* (2013.01);
(Continued)

(58) Field of Classification Search
CPC ......... C04B 41/52; C04B 41/5035; C03B 5/43
(Continued)

(56) References Cited

U.S. PATENT DOCUMENTS 3,899,341 A 8/1975 Schwarz
4,507,394 A 3/1985 Mase et al.
(Continued)

FOREIGN PATENT DOCUMENTS

EP 0 199 459 A2 10/1986
EP 0 388 747 A2 9/1990
(Continued)

*Primary Examiner* — Zulmariam Mendez
(74) *Attorney, Agent, or Firm* — Oliff PLC

(57) ABSTRACT

A sintered product made from a starting batch containing 5 to 50% zircon and having the following average chemical composition, in weight percentages on the basis of the oxides and for a total of 100%:
- silica and zirconia, the zirconia content ($ZrO_2$) being at least 64%,
- at least 0.2% of a dopant selected from $V_2O_5$, $Nb_2O_5$, $Ta_2O_5$, and mixtures thereof,
- optionally, a stabilizer selected from $Y_2O_3$, MgO, CaO, $CeO_2$, and mixtures thereof, at a content of 6% or less,
- "other oxides" at a content of 6.7% or less.

24 Claims, 1 Drawing Sheet

(52) U.S. Cl.
CPC ............. *C04B 2235/3206* (2013.01); *C04B 2235/3208* (2013.01); *C04B 2235/3217* (2013.01); *C04B 2235/3225* (2013.01); *C04B 2235/3229* (2013.01); *C04B 2235/3232* (2013.01); *C04B 2235/3239* (2013.01); *C04B 2235/3248* (2013.01); *C04B 2235/3251* (2013.01); *C04B 2235/3267* (2013.01); *C04B 2235/3275* (2013.01); *C04B 2235/3279* (2013.01); *C04B 2235/3281* (2013.01); *C04B 2235/3284* (2013.01); *C04B 2235/3418* (2013.01); *C04B 2235/5436* (2013.01); *C04B 2235/72* (2013.01); *C04B 2235/727* (2013.01); *C04B 2235/9669* (2013.01)

(58) Field of Classification Search
USPC ...................................... 204/247.4
See application file for complete search history.

(56) References Cited

U.S. PATENT DOCUMENTS

| | | | |
|---|---|---|---|
| 4,999,097 A * | 3/1991 | Sadoway | ............... 204/247.3 |
| 5,122,317 A | 6/1992 | Chen et al. | |
| 5,124,287 A | 6/1992 | Wehrenberg et al. | |
| 6,121,177 A | 9/2000 | Guigonis et al. | |
| 2009/0038936 A1 * | 2/2009 | Boussant-Roux et al. | ... 204/242 |

FOREIGN PATENT DOCUMENTS

| | | |
|---|---|---|
| GB | 1 236 286 | 6/1971 |
| WO | WO 2006/073841 A1 | 7/2006 |
| WO | WO 2006/108945 A1 | 10/2006 |

\* cited by examiner

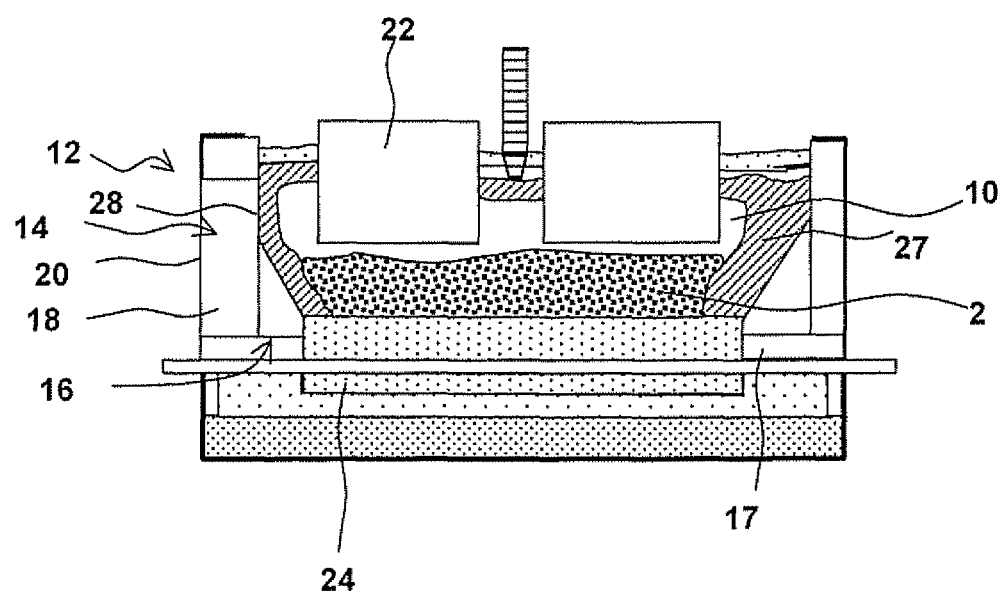

DOPED SINTERED PRODUCT BASED ON ZIRCON AND ZIRCONIA

This invention relates to new sintered products made from zircon and zirconia, a method for their manufacture and use, in particular in a glassmaking furnace.

Among refractory products, fused-cast products and sintered products may be distinguished.

Unlike sintered products, fused-cast products usually comprise a very large intergranular glassy phase which fills in the gaps in the crystallized grain lattice. The problems encountered in the application of sintered products and fused-cast products, and the technical solutions adopted to solve them are therefore generally different. Also, because of the substantial differences between their manufacturing methods, a composition developed for manufacturing a fused-cast product may not a priori be used as such for manufacturing a sintered product, and vice versa.

Sintered products are obtained by mixing appropriate raw materials, then making a green form from this mixture and firing the resulting green form at a temperature and for a time that are sufficient to sinter such a green form.

The sintered products, according to their chemical composition, are intended for a wide variety of industries.

Thus, a sintered product adapted to a particular application will a priori not possess the properties required to be used in another application where temperature, corrosion or abrasion are different.

For example, U.S. Pat. No. 3,899,341 describes sintered products made from zircon (50-90%) and zirconia. Zirconia is partially stabilized in order to restrict elastic deformations of products leading to crack formation. However, products according to U.S. Pat. No. 3,899,341 are designed to be used in contact with molten steel. Therefore, they are not, a priori, adapted to be used in contact with molten glass.

Products made from zircon, zirconia or a mixture of both these raw materials are generally quite different, in particular in regard to electrical resistivity and corrosion resistance. Generally, the teachings of a document pertaining to a material made from zirconia, such as U.S. Pat. No. 4,507,394, or from zircon, do not directly provide any usable knowledge for the manufacture of a multiphase material made from zirconia and zircon.

Dense products made from zircon (zirconium silicate: $ZrO_2.SiO_2$ or $ZrSiO_4$) and in some instances zirconia (zirconium oxide: $ZrO_2$), may be used in applications where they are in direct contact with the molten glass, in particular molten non-alkaline glass:

U.S. Pat. No. 5,124,287 discloses products containing 75 to 95% zircon and titanium oxide, intended to be in contact with molten glass. The presence of titanium oxide is considered to favor the densification of products obtained after sintering. In the final product, zirconia must not be stabilized, so that it is preferred to use non-stabilized zirconia in the starting mixture.

WO 2006/073841 discloses refractories for use in the glass industry. These zircon-based materials may include $Y_2O_3$. They always include at least 1% $P_2O_5$ or $V_2O_5$.

U.S. Pat. No. 6,121,177 in the name of Société Européenne des Produits Réfractaires discloses zircon- and zirconia-based sintered products having improved glass corrosion resistance allowing large blocks to be manufactured without crack formation, with a dilatometric behavior such that the joints between blocks are sealed at the operating temperature of the furnaces and at a low cost. The sintered products are made from a starting batch containing 5 to 40% zircon and zirconia. Their zirconia content is 82 to 96%. They also contain alumina (0.2 to 2.5%), yttrium oxide (0.4 to 5%) and titanium oxide (0.2-3%).

In a particular application, the refractory block, referred to as an "electrode-supporting block", serves as a support for an electric furnace electrode for fusing glass. As such, it should not only efficiently resist corrosion by molten glass with which it is in contact, but also have a large electrical resistivity at operational temperatures, generally ranging from 1,450° C. to 1,500° C., so as to reduce the amount of leakage current. A rapid degradation of the refractory near the electrode, in particular of the refractory material making up the electrode-supporting block, is thus avoided.

Due to the present increasing use of very high quality glasses, requiring high melting temperatures and therefore ever increasing electrical energies, higher requirements are imposed to the refractory material used in glassmaking furnaces, in particular for the products used in electrode-supporting blocks. Therefore, there is a need for a new refractory product having a large electrical resistivity, in particular at temperatures of approximately 1,500° C., and a good molten glass corrosion resistance.

The aim of the present invention is to meet this need.

For this purpose, the invention proposes a sintered product made from a starting batch containing 5 to 50% zircon, in percentage by weight on the basis of the dry starting batch and having the following average chemical composition, in percentages by weight on the basis of the oxides and for a total of 100%:

silica and zirconia, wherein the zirconia content is at least 64%,
at least 0.2% of a dopant selected from $V_2O_5$, $Nb_2O_5$, $Ta_2O_5$, and mixtures thereof,
optionally, a stabilizer selected from $Y_2O_3$, MgO, CaO, $CeO_2$, and mixtures thereof, at a content of 6% or less,
"other oxides" at a content of 6.7% or less.

As shown in further detail in the following description, the presence within the inventive product of a dopant selected from the group comprising $V_2O_5$, $Nb_2O_5$, $Ta_2O_5$, and mixtures thereof, improves electrical resistivity without any redhibitory degradation of molten glass corrosion resistance.

Moreover, the inventors have discovered that in the zircon-zirconia multiphase products according to the present invention, it was particularly beneficial to have, in addition to the dopant, at least 0.4% of a zirconia stabilizer selected from $Y_2O_3$, MgO, CaO, $CeO_2$, and mixtures thereof, provided that the molar ratio D/S of the total dopant content D to the total stabilizer content S is such that $0.7 \leq D/S \leq 2$. Preferably, $D/S \leq 1.5$, preferably $D/S \leq 1.4$ and more preferably, $D/S \leq 1.2$.

Specifically, the inventors have discovered a relationship in multiphase products between the dopant/stabilizer (D/S) molar ratio, on the one hand, and electrical resistivity and corrosion resistance, on the other hand. The product according to the invention thus preferably has a molar radio D/S ranging from 0.7 to 2. The sintered product according to the invention then represents an optimal trade-off between electrical resistivity at a temperature of about 1,500° C. and molten glass corrosion resistance. Thus, it is well suited to applications such as an electrode-supporting block, particularly when it is intended to be in contact with a molten glass such as a reinforcement glass (E glass) and an electronic glass, the latter being particularly intended for the manufacture of TV or computer glass flat screens.

Preferably, the product according to the present invention also has one or more of the following optional features;

The total dopant content ($V_2O_5+Nb_2O_5+Ta_2O_5$) is 0.4% or more, preferably 0.8% ore more, more preferably 1% or more, and still more preferably 1.4% or more, and/or 6% or less, preferably 2.2% or less, more preferably 1.8% or less, and still more preferably 1.5% or less, in percentages by weight on the basis of the oxides.

The total zirconia and silica content, in free form or as zircon, is greater than 81%, preferably greater than 85%, more preferably greater than 86.5%, still more preferably greater than 90%, and even more preferably greater than 95%, in percentages by weight on the basis of the oxides.

The total zirconia content is at least 67%, preferably at least 70%, more preferably at least 75%, still more preferably 79%, or even greater than 82%, and/or less than 97%, preferably less than 90%, more preferably less than 87%, still more preferably less than 85%, in percentages by weight on the basis of the oxides.

The dopant is selected from $Nb_2O_5$, $Ta_2O_5$, and mixtures thereof.

The preferred dopant is $Nb_2O_5$.

Said molar ratio D/S is 0.81 or more, preferably 0.9 or more, more preferably greater than 0.95 and/or 2 or less, preferably 1.5 or less, preferably 1.4 or less, preferably 1.2 or less, more preferably 1.1 or less, and still more preferably 1.05 or less.

The "other oxides" also include at least one sintering promoter, which is preferably selected from the group consisting of $Al_2O_3$, $TiO_2$, $Cu_2O$, CuO, BeO, NiO, ZnO, $MnO_2$, $Co_2O_3$, and mixtures thereof. Preferably, at least one sintering promoter is selected from the group comprising $Al_2O_3$, $TiO_2$, BeO, ZnO, $MnO_2$, and mixtures thereof. This is because $Cu_2O$, CuO, NiO and $Co_2O_3$ have a tendency to color the glass with which they are in contact.

Preferably, the $Al_2O_3$ content is greater than 0.2%, preferably greater than 0.5%, and/or less than 2.5% or less, preferably 2% or less, more preferably 1.5% or less, still more preferably 1% or less, in percentages by weight on the basis of the oxides.

Preferably, the content of other sintering promoters, preferably $TiO_2$, is greater than 0.2%, preferably greater than 0.4%, and/or less than 3%, preferably less than 2%, preferably less than 1.5%, in percentages by weight on the basis of the oxides.

The total content of stabilizer ($Y_2O_3+MgO+CaO+CeO_2$) is 0.4% or more, preferably 0.5% or more, more preferably 0.8% or more, still more preferably 1% or more, and/or less than 6%, preferably less than 4%, more preferably less than 2.2%, still more preferably less than 1.8%, and even more preferably less than 1.5%, in percentages by weight on the basis of the oxides.

Preferably, the stabilizer is selected from $Y_2O_3$, $CeO_2$, and mixtures thereof. $Y_2O_3$ is the most preferred stabilizer.

The sintered product has an electrical resistivity measured at 1,500° C. and at a frequency of 100 Hz greater than 100 Ω·cm.

The sintered product has an E glass corrosion resistance index is 60 or more, according to the test disclosed below.

The sintered product is provided as a block, preferably weighing more than 5 kg, preferably more than 10 kg.

The present invention also relates to a process for manufacturing a sintered product, comprising the following steps:

a) preparation of a mixture of raw materials to form a starting batch,
b) formation of a green part from said starting batch,
c) sintering of said green part so as to obtain said sintered product, wherein the starting batch is determined in such a way that said product is according to the present invention.

Preferably, the process according to the present invention also has one or more of the following optional features:

The zircon content in said starting batch is 45.5% or less, preferably 45% or less, more preferably 40% or less, still more preferably 38% or less, and/or 6.4% or more, preferably 15% or more, more preferably 27% or more, and even more preferably 34% or more.

The starting batch contains at least 40%, preferably at least 50%, more preferably at least 55% of zirconia added to zircon, whether or not stabilized, in percentages by weight on the basis of the dry starting batch. An added zirconia content of about 60% is most preferred.

Preferably, in step a) one or more oxides from $Y_2O_3$, MgO, CaO, $CeO_2$, $V_2O_5$, $Nb_2O_5$, $Ta_2O_5$, precursors and mixtures thereof, are added intentionally, that is systematically and methodically, in amounts ensuring that the sintered product obtained in step e) is according to the present invention.

The invention also relates to a product manufactured according to a process of this invention.

Moreover, the invention also relates to the use of a refractory product according to the invention or manufactured according to a process of the invention, in a glass-making furnace, in particular in regions of the furnace that are in contact with molten glass, particularly with an E glass and/or a glass having higher resistivity than E glass, and/or in applications where an electrical resistivity greater than 100 Ω·cm, preferably greater than 150 Ω·cm, more preferably greater than 200 Ω·cm, measured at 1500° C. and at the frequency of 100 Hz, is desired. The invention thus relates in particular to its use as an "electrode-supporting block".

The invention also relates to the use, in an electrolysis cell, of a refractory product according to the invention or manufactured according to a process of the invention.

Finally, the invention relates to an electrolysis cell comprising a plurality of refractory blocks, characterized in that at least one of said blocks includes, or is made up of, a sintered product according to the invention or a sintered product manufactured or manufacturable according to a process of the invention. In particular, this block may be placed in a region where said sintered product can be brought in contact with molten cryolite. It may be part of a sidewall of the cell.

Further features and advantages will become apparent from the following detailed description.

In the present description and as is conventionally accepted, "free zirconia" refers to zirconia $ZrO_2$ molecules which are not linked to molecules of silica or $SiO_2$ in the form of zircon. Similarly, by "free silica" refers to $SiO_2$ molecules which are not associated with $ZrO_2$ molecules in the form of zircon. Dissociation of zircon leads to free zirconia and free silica. However, free zirconia and free silica may also come from sources other than zircon. In the following disclosure, "added zirconia" and "added silica" refer to zirconia and silica that may possibly be added to zircon in the starting batch.

The silica $SiO_2$ content in the product according to the invention corresponds to the total content, within the starting batch, of silica $SiO_2$ in the zircon introduced into this batch and added silica. This content is also equal to the total content, in the sintered product, of the silica combined with zirconia in the zircon of the product and of the free silica.

The term "impurities" is understood to mean unavoidable components that are necessarily added together with the raw materials or resulting from reactions with said components. Impurities are not required but only tolerated components.

The term dopant or stabilizer "precursor" is understood to mean a component adapted to provide a dopant or stabilizer, respectively, when manufacturing a product according to the invention.

By "temporary", it is meant "removed from the product during sintering".

The term "size" of a grain or a particle is understood to mean the average of its largest dimension dM and its smallest dimension dm: (dM+dm)/2.

Conventionally, the "median size of particles or grains" of a mixture of particles or a collection of grains, is the size that divides the particles in this mixture or the grains in this collection into first and second populations equal in number, these first and second populations only comprising those particles or grains that have a size greater or smaller to the median size, respectively.

An E glass has the following chemical composition, according to ASTM-D standard 578-05, "Standard Specification for Glass Fiber Strands" (in percentages by weight):

$B_2O_3$; 0-10%
CaO: 16-25%
$Al_2O_3$: 12-16%
$SiO_2$: 52-62%
MgO: 0-5%
Alkaline oxides: 0-2%
$TiO_2$: 0-1.5%
$Fe_2O_3$: 0.05-0.8%
Fluorine: 0-1%

The composition of the product according to the invention, determined through chemical composition, only provides contents of silica $SiO_2$ and zirconia $ZrO_2$ as a whole, without distinguishing the corresponding contents zircon.

Unless otherwise specified, all percentages are percentages by weight on the basis of the oxides when referring to the sintered product and on the basis of the dry weight of the starting batch when referring to said batch.

By "comprising" or "including", it is meant "comprising at least", or "including at least", unless otherwise specified (for example, for a composition "comprising" constituents, if the total content of these constituents is 100%, this composition, of course, does not contain any other constituent).

FIG. 1 schematically represents an electrolysis cell, in a cross section according to a median plan.

In order to manufacture a product according to the invention, steps a) to c) above can be followed.

In step a), a mixture of raw materials is prepared for forming a starting batch.

Preferably, all of the raw materials used have a median size of less than 50 μm.

According to the invention, it is essential that the starting batch includes at least 5% (see example 2 below), preferably at least 15% zircon, on the basis of the dry starting batch. The advantageous properties of the product according to the invention would not otherwise be achieved if the amounts of $SiO_2$ and $ZrO_2$ introduced by the zircon according to the invention were introduced as free silica and free zirconia.

Further, the starting batch should include at most 50% zircon, on the basis of the dry starting batch. Beyond this limit, corrosion resistance would not be appropriate.

Zircon may be provided through zircon sand or chamotte of dense products having a high content of crushed zircon.

Preferably, the composition of the starting batch is determined such that, in the sintered product, the total content of zirconia, both as zircon and as free zirconia, amounts to at least 66%, preferably at least 70%, more preferably at least 75%, still more preferably at least 79%, or even more than 82%, in percentages by weight on the basis of the oxides.

Preferably, the starting batch includes at least 40%, preferably at least 50% of zirconia added to zircon, in percentages by weight on the basis of the dry starting batch. This content may be as high as 80% or even more. The zirconia in the starting batch may or may not be stabilized. It may predominantly, that is by more than 50% by weight, have a monoclinic structure.

The raw materials containing zirconia also contain small amounts of $HfO_2$ (generally less than 2%) and, as is usually known, no distinction is made between the two oxides.

Silica, and the glassy phase it generates, play an important part as far as feasibility is concerned, in particular for blocks heavier than 10 kg. The glassy phase is caused by the dissociation of zircon and by the possibly added silica, which may be introduced by the zirconia used and if necessary through intentional addition (e.g. silica fume or glass). The glassy phase resulting from the dissociation or zircon is the one most preferred. Preferably, no silica is added to the starting batch unless it is in the form of zircon.

According to the invention, the starting batch also contains a dopant selected from the group comprising $V_2O_5$, $Nb_2O_5$, $Ta_2O_5$, precursors thereof and mixtures of such dopants and/or precursors thereof. $Nb_2O_5$ is the preferred dopant.

The dopant may be added in a form associated or not with zirconia.

Preferably, the dopant is incorporated into the starting batch as a fine powder having a median size of less than 50 μm. The same applies to stabilizers that would not be introduced in combination with zirconia.

Finally, the starting batch may include additional species:
at least one stabilizer of zirconia or precursors of such stabilizers;
sintering and shaping agents well known to those skilled in the art for conventional sintering manufacturing processes, such as binder agents, plasticizers, sintering promoters, deflocculants;
impurities.

By "other oxides", it is meant additional species that are not temporary.

A stabilizer may be added to the starting batch independently from zirconia. However, the stabilizer may also be added to the starting batch, at least partially, as stabilized zirconia. The stabilizer may also be introduced as a precursor, for example as a calcium carbonate.

The zirconia stabilizer is preferably selected from the group comprising $Y_2O_3$, MgO, CaO, $CeO_2$ and mixtures thereof, in particular when the product according to the invention is intended to be in contact with molten glass.

$Y_2O_3$ and $CeO_2$ are preferred stabilizers when the refractory product according to the invention may be brought in contact with vapors released from the glass, as MgO and CaO may lead to crack formation. $Y_2O_3$ is the most preferred stabilizer.

Preferably, the content of stabilizer, preferably yttrium oxide ($Y_2O_3$), is determined in such a way that in the sintered product its content in percentage by weight on the basis of the oxides, exceeds 0.4%.

Since the addition of stabilizer is done to the detriment of other components, the use of large amounts of stabilizer may lead to a decrease in the intended properties, in particular corrosion resistance. Therefore, it is preferred to determine the stabilizer content so that, in the sintered product, it amounts to 6% or less, preferably 4% or less, more preferably 2.2% or less, preferably 1.8% or less, and still more preferably 1.5% or less, in percentages by weight on the basis of the oxides.

The stabilizer may be added as an impurity, in particular of zircon, and/or as a raw material added independently from the other raw materials.

The presence of a stabilizer is particularly advantageous for the industrial feasibility of blocks weighing more than 10 kg.

When at least one zirconia stabilizer is added to the starting batch, the total amount of stabilizer is determined so that the molar ratio D/S of the total dopant content D to the total stabilizer content S is preferably:

$$0.7 \leq D/S \leq 2.$$

This molar ratio D/S is preferably 0.81 or more, preferably 0.9 or more, preferably greater than 0.95 and/or 1.5 or less, preferably 1.4 or less, preferably 1.2 or less, more preferably 1.1 or less and even more preferably 1.05 or less. It should be noted that although the stabilizer content may sometimes be large, at most 10% of zirconia in the sintered product is stabilized in its quadratic and/or cubic form.

In one embodiment, the starting batch comprises a dopant precursor and/or a stabilizer precursor selected so that at least 50%, or 70%, 80%, 90% by weight, or even substantially 100% of this precursor or these precursors is decomposed into a dopant and/or stabilizer, respectively, when manufacturing the product.

In one embodiment, the dopant is not added to the starting batch in a form where it is associated with a zirconia stabilizer.

In another embodiment, the dopant and stabilizer in the starting batch are combined as a precursor, of which more than 50% by weight, or more than 70%, 80%, 90%, or even substantially 100%, is decomposed into said dopant and said stabilizer when the product is manufactured. This is not the case of $YNbO_4$, for example.

In one embodiment, the starting batch includes less then 5% by weight of $YNbO_4$, or does not even include $YNbO_4$.

Among the non-temporary sintering agents, the starting batch preferably includes at least one sintering promoter selected from the group comprising $Al_2O_3$, $TiO_2$, $Cu_2O$, $CuO$, $BeO$, $CeO_2$, $NiO$, $ZnO$, $MnO_2$, $Co_2O_3$, and mixtures thereof, preferably selected from $Al_2O_3$, $TiO_2$, $ZnO$, $MnO_2$, $BeO$, since these promoters advantageously will not have any glass coloring effect.

Preferably, the starting batch is determined in such a way that the $Al_2O_3$ content in the sintered product is greater than 0.2%, preferably greater than 0.5%, and/or is 2.5% or less, preferably 2% or less, more preferably 1.5% or less, and still more preferably 1% or less, in percentages by weight on the basis of the oxides.

In applications where the product is intended to be brought in contact with molten glass, in particular a reinforcing glass such as E glass, the upper $Al_2O_3$ content limit of 2.5% advantageously prevents the possibility of stone release and therefore of critical glass defects.

Preferably, the starting batch is also determined in such a way that the $TiO_2$ content is greater than 0.2%, preferably greater than 0.4% and/or is less than 3%, preferably less than 2%, more preferably less than 1.5%, in percentages by weight on the basis of the oxides. Beyond 3% $TiO_2$ in the sintered product, the feasibility of blocks weighing more than 5 kg is reduced.

Preferably, $Al_2O_3$ and $TiO_2$ are used together.

Preferably, the starting batch is also determined in such a way that the content of impurities in the sintered product is less than 1.2%, preferably less than 1%, more preferably less than 0.7%, still more preferably less than 0.5% and even more preferably less than 0.2%, in percentages by weight on the basis of the oxides. The impurities particularly comprise $P_2O_5$ and $Fe_2O_3$.

Preferably, the starting batch is determined in such way that, in the sintered product, in percentages by weight on the basis of the oxides:
$P_2O_5<1\%$, preferably $P_2O_5<0.9\%$, preferably $P_2O_5<0.5\%$, preferably $P_2O_5<0.3\%$ and more preferably $P_2O_5<0.2\%$ and/or
$Fe_2O_3<0.2\%$, preferably $Fe_2O_3<0.1\%$, more preferably $Fe_2O_3<0.08\%$,
the content of other impurities in the sintered product according to the invention being preferably less than 0.5%, preferably less than 0.3%, and more preferably less than 0.2%.

For contents smaller than 1.2% in the sintered product, in percentage by weight on the basis of the oxides, it is assumed that the effect of impurities does not substantially change the obtained result. Preferably, the total content of impurities is less than 1%, more preferably less than 0.7%, and even more preferably less than 0.5%, in percentages by weight on the basis of the oxides.

Preferably, in step a) one or more of the oxides $Y_2O_3$, $MgO$, $CaO$, $CeO_2$, $V_2O_5$, $Nb_2O_5$, $Ta_2O_5$, and precursors thereof, are added intentionally, that is systematically and methodically, in amounts ensuring that the sintered product obtained at step e) is according to this invention.

In step b) the mixture formed in step a) may be poured into a mold and then formed into a green part.

Preferably, the mold is shaped so that the obtained sintered product is provided as a block weighing more than 5 kg, preferably more than 10 kg.

Forming may for example be done through isostatic pressing, slip-casting, uniaxial pressing, gel casting, vibration casting or a combination of these techniques.

In step c) said green part is sintered.

Sintering is preferably carried out at a temperature ranging from 1,500 to 1,700° C., preferably in an oxidizing atmosphere, preferably air and preferably at atmospheric pressure. This may lead to partial dissociation of zircon.

After sintering, a sintered product according to the invention is obtained.

Advantageously, the sintered product has an electrical resistivity, at 1,500° C. and at a frequency of 100 Hz, greater than 100 Ω·cm, or even greater than 150 Ω·cm when the product is made from a starting batch containing 15 to 50% zircon, when it includes $Y_2O_3$ as a stabilizer, when the dopant used is $Nb_2O_3$ and when the molar ratio $Nb_2O_5/Y_2O_3$ is such that:

$$0.9 \leq Nb_2O_5/Y_2O_3 \leq 1.2.$$

The sintered product may even have an electrical resistivity, at 1,500° C. and at a frequency of 100 Hz, greater than 200 Ω·cm, in particular when the product is made from a starting batch containing 27 to 50% zircon, when it includes $Y_2O_3$ as a stabilizer, when the dopant used is $Nb_2O_5$ and when the molar ratio $Nb_2O_5/Y_2O_3$ is such that:

$$0.95 \leq Nb_2O_5/Y_2O_3 \leq 1.2.$$

The sintered product also has a corrosion resistance index Ic with respect to a glass for reinforcement fibers (E glass) at 1,500° C., of 60 or more, according to the test described below.

In a first particular embodiment, the invention relates to a sintered product made from a starting batch having a zircon content of 5 to 50%, in percentages by weight on the basis of the dry starting batch, wherein the sintered product has the following chemical composition, in percentages by weight on the basis of the oxides:

| | |
|---|---|
| $ZrO_2 + HfO_2$ | 64-97% |
| $SiO_2$ | 1.7-17% |
| $TiO_2$ | 0.2-3% |
| $Al_2O_3$ | 0.2-2.5% | a zirconia stabilizer selected from $Y_2O_3$, MgO, CaO, $CeO_2$ and mixtures thereof in a weight amount such that:
$Y_2O_3$+MgO+CaO+$CeO_2$: 0.4-6%
a dopant selected from $Nb_2O_5$, $Ta_2O_5$, $V_2O_5$, and mixtures thereof in an amount such that the dopant/stabilizer molar ratio is between 0.7 and 1.5;
Other oxides: <1.2%.

In a second particular embodiment, the invention relates to a sintered product made from a starting batch having a zircon content of 5 to 50%, in percentages by weight on the basis of the dry starting batch, wherein the sintered product has the following chemical composition, in percentages by weight on the basis of the oxides:

| | |
|---|---|
| $ZrO_2 + HfO_2$ | 74-96% |
| $SiO_2$ | 1.7-17% |
| $TiO_2$ | 0.4-1.5% |
| $Al_2O_3$ | 0.5-1.5% | a zirconia stabilizer selected from $Y_2O_3$, MgO, CaO, $CeO_2$, and mixtures thereof in a weight amount such that:
$Y_2O_3$+MgO+CaO+$CeO_2$: 0.7-2.2%
a dopant selected from $Nb_2O_5$, $Ta_2O_5$, $V_2O_5$, and mixtures thereof in an amount such that the dopant/stabilizer molar ratio is between 0.7 and 1.2;
Other oxides: <1.2%.

In a third particular embodiment, the invention relates to a sintered product made from a starting batch having a zircon content of 15% or more, in percentage by weight on the basis of the dry starting batch, wherein the sintered product has the following chemical composition, in percentages by weight on the basis of the oxides:

| | |
|---|---|
| $ZrO_2 + HfO_2$ | 74-92% |
| $SiO_2$ | 5-17% |
| $TiO_2$ | 0.4-1.5% |
| $Al_2O_3$ | 0.5-1.5% | a zirconia stabilizer selected from $Y_2O_3$, MgO, CaO, $CeO_2$, and mixtures thereof in a weight amount such that:
$Y_2O_3$+MgO+CaO+$CeO_2$: 0.7-2.2%
a dopant selected from $Nb_2O_5$, $Ta_2O_5$, $V_2O_5$, and mixtures thereof in an amount such that the dopant/stabilizer molar ratio D/S is between 0.9 and 1.2;
Other oxides: <1.2%.

Finally, in a particular most preferred fourth embodiment, the invention relates to a sintered product made from a starting batch having a zircon content of 27% or more, in percentage by weight on the basis of the dry starting batch, wherein the sintered product has the following chemical composition, in percentages by weight on the basis of the oxides:

| | |
|---|---|
| $ZrO_2 + HfO_2$ | 74-88% |
| $SiO_2$ | 9-17% |
| $TiO_2$ | 0.4-1.5% |
| $Al_2O_3$ | 0.5-1.5% | a zirconia stabilizer selected from $Y_2O_3$, MgO, CaO, $CeO_2$, and mixtures thereof in a weight amount such that:
$Y_2O_3$+MgO+CaO+$CeO_2$: 0.7-2.2%
a dopant selected from $Nb_2O_5$, $Ta_2O_5$, $V_2O_5$, and mixtures thereof in an amount such that the dopant/stabilizer molar ratio D/S is between 0.95 and 1.2;
Other oxides: <1.2%.

This invention is further illustrated by the following examples, which should not be construed to unduly limit this invention.

In these examples, the following raw materials have been used and selected and percentages are by weight:

A micronized zircon having the following average chemical composition (by weight): $ZrO_2$+$HfO_2$: 66%, $SiO_2$: 33%, $Al_2O_3$: 0.3%, $P_2O_5$: 0.3%, $Fe_2O_3$: 0.07%, $TiO_2$: 0.08%, and less than 0.2% of other compounds such as $Y_2O_3$. Particles have a median size (D50) of 2.5 μm.

Zirconia, sold by Société Européenne des Produits Réfractaires as CS10, having a median particle size (D50) of 3.5 μm and the following average chemical analysis (by weight): $SiO_2$: 0.08%, $Al_2O_3$: 0.08%, $Na_2O$: 0.02%, $Fe_2O_3$: 0.018%, $TiO_2$: 0.06%, CaO: 0.02%, MgO: 0.01%, the remainder to 100% being $ZrO_2$.

Yttrium oxide containing more than 99.9% $Y_2O_3$, having a particle size of less than 44 μm and a median particle size (D50) of 3.1 μm. Optionally, $Y_2O_3$ may be added as partially stabilized zirconia.

Titanium oxide containing about 95% $TiO_2$, having a median particle size of 2.3 μm.

Alumina having a median particle size of about 3 μm.

Niobium oxide containing about 99.5% $Nb_2O_5$ and having a median particle size of 1.5 μm.

Tantalum oxide containing about 99.85% $Ta_2O_5$ and having a particle size of less than 44 μm.

Silica in the final sintered product comes from zircon through its dissociation. Optionally, silica available in the form of silica fume or glass may be added.

Sintered refractory blocks were manufactured according to a process that includes the conventional following steps:
a) preparation of a mixture of raw materials to form a starting batch,
b) formation of a green part from said mixture,
c) sintering of said green part.

In step a), all of the raw materials were metered so that the mixture had the desired average chemical composition by weight, and then mixed in the presence of sintering agents, conventionally used deflocculants and/or binders, for example phosphoric acid.

The mixture of raw materials might if necessary be atomized before proceeding to step a).

In step b) the mixture was then formed through isostatic pressing into cylindrical green parts 200 mm in diameter and approximately 200 mm in height.

In step c) the green parts were then sintered in air at atmospheric pressure at a sintering temperature of 1,600° C. and maintained at this level for 20 hours.

From the different examples of blocks thus made, cylindrical bars of the product 30 mm in diameter and 30 mm in height were taken and subjected to a 1 volt potential difference at a frequency of 100 Hz at 1,500° C. in order to carry out measurements of electrical resistivity, designated "R" in Table 1 below, in Ω·cm.

For measuring corrosion resistance, samples in the form of cylindrical bars of the product 22 mm in diameter and 100 mm in height were taken and subjected to a test consisting in rotating the samples immersed in a bath of molten E glass for reinforcement fibers heated at 1,500° C. The sample rotation speed was 6 rpm. The duration test was 48 hours. At the end of this period, the remaining volume of corroded sample was estimated for each sample. The remaining volume of a corroded sample of the control product (example 1) is chosen as the comparison basis. The ratio of the remaining volume of any other corroded sample to remaining volume of the corroded control sample, multiplied by 100, provides an estimation of the tested sample's corrosion resistance relative to that of the control product. In Table 1 below as well as in the claims, "Ic" designates the corrosion index thus defined.

Thus, estimations greater than 100 represent a corrosion loss smaller than that of the control product. Therefore, the products in question have a better resistance to corrosion to molten glass than the control sample. Estimations below 100 represent a greater corrosion loss than that of the control product. The products in question therefore have smaller a resistance to corrosion by molten glass than the control sample. Here, the corrosion resistance is considered to be acceptable when the corrosion index Ic is 60 or more (based on example 1), and is preferably greater than 70.

Example 1, namely a control multiphase product, is the ZS90 product sold by Société Européenne des Produits Réfractaires (SEPR).

The average chemical analysis of the various tested products and the test results are shown in Table 1 (percentages by weight on the basis of the oxides). The content of impurities such as $P_2O_5$ or $F_2O_3$ is not shown in this table. However, the total content of impurities is always less than 0.6%.

TABLE 1

| Nr | % zircon in starting batch | % $ZrO_2$ + $HfO_2$ | % $SiO_2$ | % $Al_2O_3$ | % $TiO_2$ | % $Y_2O_3$ | % $Nb_2O_5$ | % $Ta_2O_5$ | mol % $Y_2O_3$ | mol % $Nb_2O_5$ | mol % $Ta_2O_5$ | $Nb_2O_5$/$Y_2O_3$ (molar ratio) | $Ta_2O_5$/$Y_2O_3$ (molar ratio) | R (ohm · cm) | Ic |
|---|---|---|---|---|---|---|---|---|---|---|---|---|---|---|---|
| 1(**) | 15.9 | 90.88 | 5.4 | 0.81 | 0.64 | 2.1 | — | — | 1.22 | — | — | 0 | — | 25 | 100 |
| 2 | 6.4 | 84.26 | 2.21 | 0.78 | 0.63 | 6 | 6 | — | 3.54 | 3.01 | — | 0.85 | — | 110 | |
| 24(*) | 12 | 83.07 | 4.09 | 0.69 | 0.73 | 10 | 2 | — | 6.01 | 1.02 | — | 0.17 | — | 20 | |
| 3(*) | 15.9 | 90.48 | 5.4 | 0.81 | 0.64 | 2.1 | 0.4 | — | 1.22 | 0.2 | — | 0.16 | — | 31 | |
| 4(*) | 15.8 | 90.32 | 5.37 | 0.81 | 0.64 | 2.1 | 0.6 | — | 1.22 | 0.3 | — | 0.25 | — | 36 | |
| 5(*) | 15.8 | 90.12 | 5.37 | 0.81 | 0.64 | 2.1 | 0.8 | — | 1.22 | 0.39 | — | 0.32 | — | 42 | |
| 6(*) | 15.8 | 89.92 | 5.37 | 0.81 | 0.64 | 2.1 | 1 | — | 1.22 | 0.49 | — | 0.4 | — | 43 | |
| 7 | 15.6 | 88.99 | 5.3 | 0.8 | 0.64 | 2.1 | 2 | — | 1.23 | 0.99 | — | 0.8 | — | 115 | |
| 8 | 15 | 89.1 | 5.1 | 0.7 | 0.74 | 2 | 2.2 | — | 1.17 | 1.09 | — | 0.93 | — | 156 | 86 |
| 9 | 15 | 87.5 | 5.1 | 0.7 | 0.73 | 2 | — | 3.8 | 1.19 | — | 1.15 | — | 0.97 | 160 | |
| 10(**) | 28.9 | 86.73 | 9.75 | 0.93 | 0.55 | 1.8 | — | — | 1.09 | 0 | — | 0 | — | 26 | |
| 11(*) | 27.8 | 86.01 | 9.38 | 0.92 | 0.55 | 1.8 | 1.1 | — | 1.09 | 0.57 | — | 0.52 | — | 58 | |
| 12 | 26.8 | 85.36 | 9.04 | 0.92 | 0.55 | 1.8 | 2.1 | — | 1.09 | 1.09 | — | 1 | — | 210 | 79 |
| 25 | 28.64 | 83.75 | 9.69 | 0.75 | 2.95 | 1.22 | 1.44 | — | 0.6 | 0.61 | — | 1.02 | — | 250 | 75 |
| 26 | 29.04 | 83.95 | 9.79 | 2.45 | 0.76 | 1.22 | 1.44 | — | 0.6 | 0.61 | — | 1.02 | — | 280 | 74 |
| 27 | 30.36 | 84.82 | 10.75 | 0.75 | 0.76 | 1.22 | 2.02 | — | 0.61 | 0.86 | — | 1.41 | — | 610 | 65 |
| 28 | 30.22 | 84.73 | 10.19 | 0.75 | 0.76 | 1.22 | 2.16 | — | 0.61 | 0.92 | — | 1.51 | — | 700 | 61 |
| 29 | 32.6 | 81.18 | 10.98 | 0.73 | 0.74 | 0.09 | 6 | — | 0.06 | 3.22 | — | 53.67 | — | 430 | 75 |
| 30 | 38.4 | 84.98 | 12.93 | 0.74 | 0.74 | 0.09 | 0.2 | — | 0.06 | 0.11 | — | 1.83 | — | 635 | 65 |
| 13(**) | 37.4 | 84.4 | 12.59 | 0.74 | 0.74 | 1.22 | — | — | 0.76 | 0 | — | 0 | — | 48 | 84 |
| 14(*) | 37.11 | 84.13 | 12.5 | 0.74 | 0.74 | 1.22 | 0.37 | — | 0.76 | 0.2 | — | 0.26 | — | 55 | |
| 15(*) | 36.75 | 83.9 | 12.38 | 0.74 | 0.74 | 1.22 | 0.73 | — | 0.76 | 0.39 | — | 0.51 | — | 67 | |
| 16 | 36.32 | 83.62 | 12.23 | 0.74 | 0.74 | 1.22 | 1.16 | — | 0.76 | 0.62 | — | 0.82 | — | 195 | |
| 17 | 35.94 | 83.47 | 12.1 | 0.74 | 0.74 | 1.22 | 1.44 | — | 0.76 | 0.76 | — | 1 | — | 443 | 71 |
| 31 | 35.48 | 83.07 | 11.95 | 0.74 | 0.74 | 1.22 | 0.75 | 1.15 | 0.77 | 0.4 | 0.37 | 0.52 | 0.48 | 417 | 73 |
| 18 | 35.75 | 83.24 | 12.04 | 0.74 | 0.74 | 1.22 | 1.73 | — | 0.76 | 0.92 | — | 1.21 | — | 520 | 66 |
| 19(**) | 47.38 | 80.99 | 15.93 | 0.76 | 0.74 | 1.22 | — | — | 0.79 | 0 | — | 0 | — | 70 | 79 |
| 20(*) | 46.73 | 80.46 | 15.71 | 0.76 | 0.74 | 1.22 | 0.75 | — | 0.79 | 0.41 | — | 0.52 | — | 90 | |
| 21 | 45.94 | 80.05 | 15.45 | 0.75 | 0.74 | 1.22 | 1.44 | — | 0.79 | 0.79 | — | 1 | — | 645 | |
| 22 | 48.5 | 80.33 | 16.31 | 0.86 | 0.65 | 0.7 | 0.8 | — | 0.46 | 0.44 | — | 0.96 | — | 750 | 66 |
| 23 | 48.5 | 80.33 | 16.31 | 0.86 | 0.65 | 0.5 | — | 1 | 0.33 | — | 0.33 | — | 1 | 750 | 66 |

(**)Examples outside the scope of this invention
The examples according to the invention without the (*) symbol are preferred examples.

Examples 1, 10, 13 and 19 are representative of the state of the art, in which multiphase zircon/zirconia products were not appropriate for applications where strong resistivity and good corrosion resistance were both required.

In Table 1, it may be seen, surprisingly, that at a substantially constant zircon content in the starting batch, the products according to the invention have an improved electrical resistivity (examples 1 and 3 to 9, 10 to 12, 13 to 18, 19 to 23) and an acceptable corrosion resistance, with an Ic index remaining at 60 or more, preferably 70 or more. Surprisingly, the inventors also noticed that the dopant/stabilizer molar ratio influences the electrical resistivity measured at 1,500° C. They also observed that, for the same dopant/stabilizer ratio, a product having a zircon content in the starting batch greater than that of a second product, had an electrical resistivity measured at 1,500° C. greater than that of the latter (examples 11, 15, 20; examples 12, 17, 21). In other words, the electrical resistivity at 1,500° C. may be increased by simultaneously acting on three factors: adding a dopant, modifying the dopant/stabilizer ratio, and the amount of zircon in the starting batch.

However, the inventors have also found that at a substantially constant zircon content in the starting batch, the addition of dopant significantly and surprisingly reduces the corrosion resistance of products (examples 1 and 8; examples 13, 17 and 18, examples 19 and 22).

According to the invention, an optimal trade-off is obtained with product 17, which is the one most preferred.

Of course, the present invention is not restricted to the embodiments described and shown herein by way of non limiting illustrative examples.

The use of the inventive products is not restricted to an application to glassmaking furnaces. In particular, such products can be advantageously used in any other application requiring a refractory product with high electrical resistivity. In particular, they can be used in the construction of electrolysis cells for aluminum. As represented in FIG. 1, aluminum metal 2 can be produced industrially through electrolysis of an alumina solution in a fused cryolite-based bath 10.

Conventionally, the electrolyte bath 10 is contained in an electrolysis cell 12. The cell 12 comprises a sidewall 14 and a bottom portion 16. The bottom portion 16 is composed of lower refractory blocks 17 and cathode blocks 24 and, in a lower portion, of insulating blocks. The sidewall 14 is formed of lateral refractory blocks 18 surrounded by a metal shell 20 or "casing", which is more or less insulated.

The cell 12 comprises at least an anode 22 and at least a cathode 24. The anodes 22 and cathodes 24 are conventionally disposed so as to be in contact with the electrolyte bath 10, the cathodes 24 being conventionally disposed close to the bottom portion 16.

The passage of electric current, with a strong intensity, through the bath 10 generates heat by Joule effect. The evacuation of this heat through the sidewall 14 of the cell 12 produces the deposit of a layer 27 of solidified cryolite on the interior surface 28 of the blocks 18.

The blocks are used at temperatures of 950° C. or less.

In example 17 of the present invention, the electrical resistivity at 950° C. was therefore compared with that of a reference block made of silicon carbide (SiC) linked through a silicon nitride ($Si_3N_4$) matrix using the same protocol as above but at a temperature of 950° C.

The electrical resistivity at 950° C. in example 17 is 49,000 Ω·cm whereas that of the control block is 6000 Ω·cm.

The level of resistance to corrosion by the cryolite was estimated by maintaining samples having a cross-section of 25 mm×25 mm from example 17 and the control block for a 22 hour period at 1,030° C. in a molten cryolite bath. The sample of example 17 has a corroded volume (volume reduction due to corrosion) twice smaller than that of the control block.

The refractory products according to the invention are therefore perfectly suited for use in an electrolysis cell, specifically for aluminum, in particular as a sidewall component in such a cell and/or in an region thereof where they can be brought in contact with molten cryolite.

The invention claimed is:

1. A sintered product made from a starting batch containing a dopant selected from the group consisting of $Nb_2O_5$, $Ta_2O_5$, precursors thereof, and mixtures of such dopants and/or precursors thereof, and 5 to 50% zircon, in percentage by weight on the basis of the dry starting batch weight, and having the following average chemical composition, in percentages by weight on the basis of the oxides and for a total of 100%:
   silica, $SiO_2$, and zirconia, $ZrO_2$, the content of zirconia being at least 64%,
   at least 0.2% of a dopant selected from the group consisting of $Nb_2O_5$, $Ta_2O_5$, and mixtures thereof,
   optionally, a stabilizer selected from the group consisting of $Y_2O_3$, MgO, CaO, $CeO_2$, and mixtures thereof, at a content of 6% or less, and
   other oxides at a content of 6.7% or less.

2. A sintered product according to claim 1, comprising at least 0.4% of said stabilizer, wherein a molar ratio D/S of a total dopant content D to a total stabilizer content S is such that 0.7≤D/S≤2.

3. A sintered product according to claim 2, in which D/S≤1.5.

4. A sintered product according to claim 2, wherein 0.81≤D/S and/or D/S≤1.2.

5. A sintered product according to claim 2, wherein 0.9≤D/S and/or D/S≤1.1.

6. A sintered product according to claim 1, wherein a total dopant content ($Nb_2O_5+Ta_2O_5$) is 0.4% or more and/or 6% or less, in percentages by weight on the basis of the oxides.

7. A sintered product according to claim 6, wherein the total dopant content ($Nb_2O_5+Ta_2O_5$) is 1% or more and/or 2.2% or less, in percentages by weight on the basis of the oxides.

8. A sintered product according to claim 1, wherein the dopant is $Nb_2O_5$.

9. A sintered product according to claim 1, wherein a total content of zirconia and silica is greater than 90%, in percentage by weight on the basis of the oxides.

10. A sintered product according to claim 1, wherein a total content of zirconia is at least 67% and/or less than 90%, in percentages by weight on the basis of the oxides.

11. A sintered product according to claim 10, wherein the total content of zirconia is at least 75% and/or less than 85%, in percentages by weight on the basis of the oxides.

12. A sintered product according to claim 1, comprising at least one sintering promoter selected from the group consisting of $Al_2O_3$, $TiO_2$, $Cu_2O$, CuO, BeO, NiO, ZnO, $MnO_2$, $Co_2O_3$, and mixtures thereof.

13. A sintered product according to claim 12, wherein a content of $Al_2O_3$ is greater than 0.2%, and/or 2.5% or less, and/or a content of $TiO_2$ is greater than 0.2% and/or less than 3%, in percentages by weight on the basis of the oxides.

14. A sintered product according to claim 13, wherein the content of $Al_2O_3$ is greater than 0.5%, and/or 1.5% or less, and/or the content of $TiO_2$ is greater than 0.4% and/or less than 1.5%, in percentages by weight on the basis of the oxides.

15. A sintered product according to claim 1, having an electrical resistivity at 1,500° C. and a frequency of 100 Hz, greater than 100 Ω·cm and an E glass corrosion resistance index Ic of 60 or more.

16. An electrolysis cell, comprising a plurality of refractory blocks, wherein at least one of said blocks is the sintered product according to claim 1.

17. An electrolysis cell comprising a plurality of refractory blocks, wherein at least one of said blocks is the sintered product according to claim 2.

18. A cell according to claim 16, wherein said sintered product is disposed so as to be able to be brought in contact with molten cryolite.

19. A cell according to claim 16, wherein said sintered product is part of a sidewall of the cell.

20. A process for manufacturing a sintered product, comprising the following steps:
   a) preparing a mixture of raw materials for forming a starting batch,
   b) forming a green part from said starting batch,
   c) sintering said green part so as to obtain said sintered product,
      wherein the starting batch is determined in such a way that the sintered product is the sintered product according claim 1.

21. A manufacturing process according to claim 20, wherein a zircon content in said starting batch is 40% or less, and/or 34% or more, in percentages by weight on the basis of the dry starting batch.

22. A manufacturing process according to claim 20, wherein the starting batch contains at least 50% zirconia added to zircon, whether stabilized or not, in weight percentages on the basis of the dry starting batch.

23. A manufacturing process according to claim 20, wherein powders forming said raw materials have a median size of less than 50 μm.

24. An electrode-supporting block comprising the sintered product according to claim 1.

\* \* \* \* \*